UNITED STATES PATENT OFFICE.

CARL DELLWIK, OF ROGERS PARK, ILLINOIS.

PROCESS OF TREATING INCANDESCENTS.

SPECIFICATION forming part of Letters Patent No. 450,961, dated April 21, 1891.

Application filed December 20, 1889. Serial No. 334,451. (No specimens.)

*To all whom it may concern:*

Be it known that I, CARL DELLWIK, a subject of the King of Sweden, residing at Rogers Park, Cook county, and State of Illinois, have made a new and useful Improvement in the Process of Treating Incandescents, of which the following is a specification.

The object of my invention is to furnish a method by which incandescents for the creation and distribution of light by means of gas-flames can be treated so as to be made more durable and so that they will supply an increased illumination with the same consumption of gas.

Experience has shown that one of the principal difficulties to be overcome in the use of incandescents for lighting purposes has been the comparatively short life of the incandescents and the continuous decrease of the candle-power thereof, as well as the comparatively small amount of light disseminated thereby.

Heretofore incandescents have been usually manufactured from magnesia, lime, zircon, and other comparatively poor conductors of heat, or such as I have hereinafter denominated "non-conducting materials." Such non-conducting materials have been used to a considerable extent and with varying success in producing light by the use of gas-flames, but have never been of such definite and certain value as to have been reduced to general use.

My invention overcomes many of the difficulties attending the use of the simple materials hereinbefore referred to by so treating them with a material having the quality of readily conducting the heat as to concentrate the effect of the heat, and thus to utilize the flame temperature of the gas to the greatest possible extent. Therefore I am able to furnish the highest incandescence and the greatest amount of light with the least possible strain upon the durability of the incandescent. To carry my invention into effect, I take the ordinary incandescent in whatever form the same may be desired, or may be found of the greatest practical utility, and coat a part of the same with a material known to have no deleterious effect upon the illuminating power of such incandescent and at the same time which shall be one of the materials known as a good conductor of heat.

It will be observed that I prefer to coat only a part of the incandescent and not the entire area thereof. This I have found in actual practice to be of great moment. Such part should be the portion from which the light is to be disseminated and the part where the greatest heat is centered. I have always noticed that such parts of the incandescents as are outside the hotter sections of the flame give a comparatively small amount of disseminated light. I have discovered that such outlying parts are more useful in limiting the zone of greatest heat than in furnishing illumination. By leaving such parts without the application of the coating referred to they remain in such condition that they convey the smallest amount of heat from the hotter area of the incandescents where the light is disseminated, whereas if such parts are coated with the highly-conducting materials the heat, which I prefer to concentrate in a narrow space, is conveyed and spread out to such an extent that its greatest effect is diminished, if not destroyed. I do not intend to state that the luminous area cannot be extended by increasing the heat and the area of the incandescents; but what I do intend to state is that in the case of large or small incandescents not all of the same can be profitably or usefully coated with the materials referred to.

Although I have mentioned the use of materials having a high power of conducting heat, yet not all materials having such power can be profitably or economically employed. Many of such, either by color, texture, physical properties, or the chemical effects of the heat upon them, produce a result so injurious or prejudicial to the light that they are of no practical use. For instance, iron, molybdenum, or cerium, although they possess the qualities of being good conductors of heat, are not such as can be utilized for the purposes of my invention, because their effect upon the light is so deleterious. Metals such as chromium, cobalt, copper, platinum, and iridium are at the same time good conductors of heat, and when applied in accordance with my process greatly increase the illuminating effect of the incandescing material when subjected to a gas-flame.

To utilize the proper materials above referred to, I form a solution of the material desired and paint or coat the incandescent to be treated to such a point or at such a part as it is desired that the same shall become highly luminous and allow the same to dry. When properly dried, the incandescent must be submitted to a high degree of temperature for a short time before the best results therefrom can be obtained.

When heated, some of the coatings above referred to are reduced to the form of oxides. Such are chromium, cobalt, copper, and others, which any person skilled in the art will at once discern. Others when subjected to the same heat are reduced to a metallic state. Such are, for instance, platinum and iridium.

I find in practice that when the incandescents are properly treated in the manner herein described a much greater candle-power is attained, and that they also become more durable than if the same materials are used without such treatment.

Having described my invention, what I desire to secure by Letters Patent is—

The herein-described process of treating incandescents which are non-conductors of heat, which consists in coating the part or parts thereof where the incandescence is desired with a solution of material which is a conductor of heat, substantially as described.

CARL DELLWIK.

Witnesses.
JOHN JENKINS, Jr.,
ALFRED LOCKWOOD BROWN.